Figure 1:
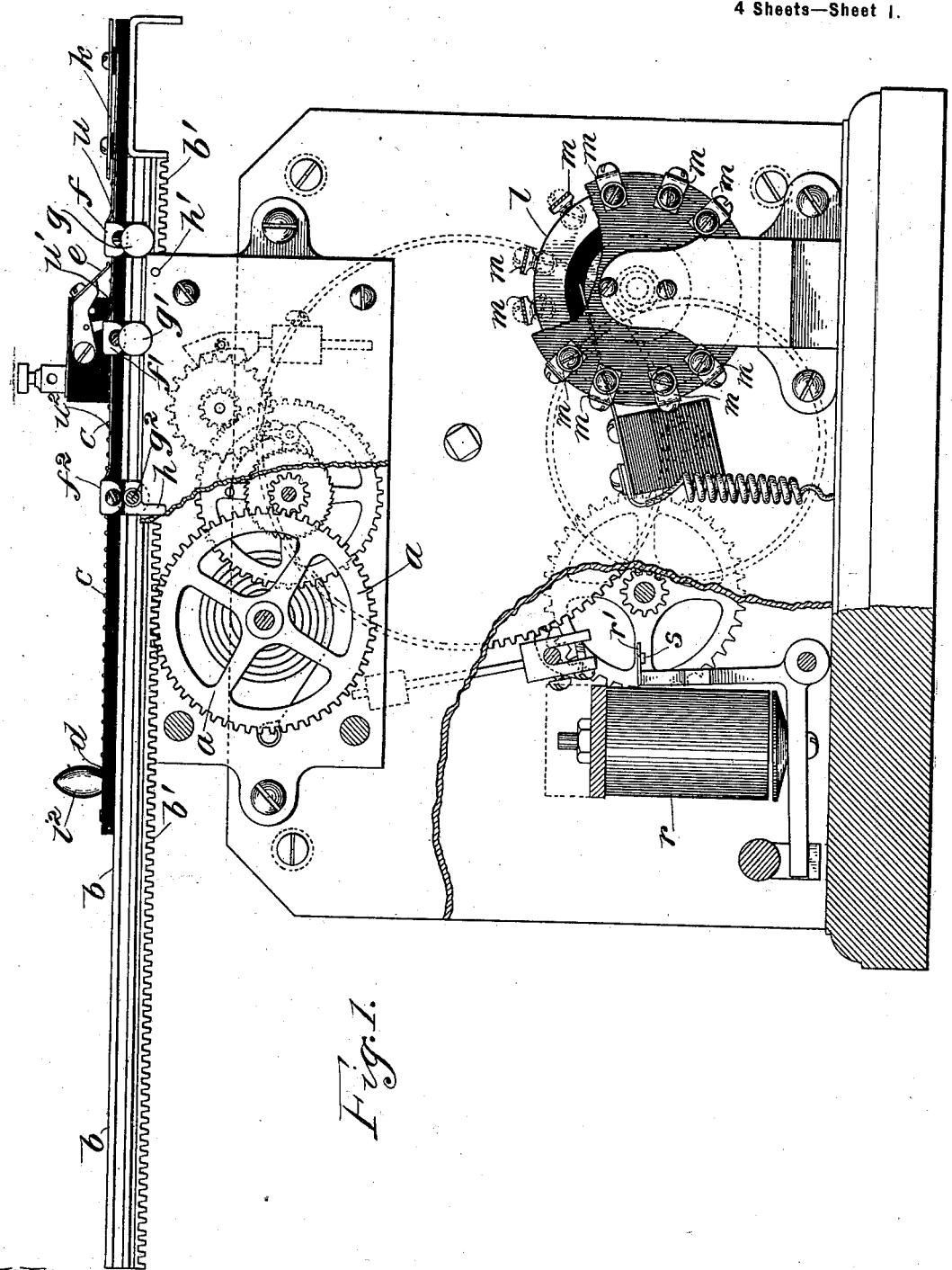

No. 662,527. Patented Nov. 27, 1900.
E. B. ELLICOTT.
TELEGRAPH SIGNALING APPARATUS.
(Application filed Dec. 8, 1899.)
(No Model.) 4 Sheets—Sheet 1.

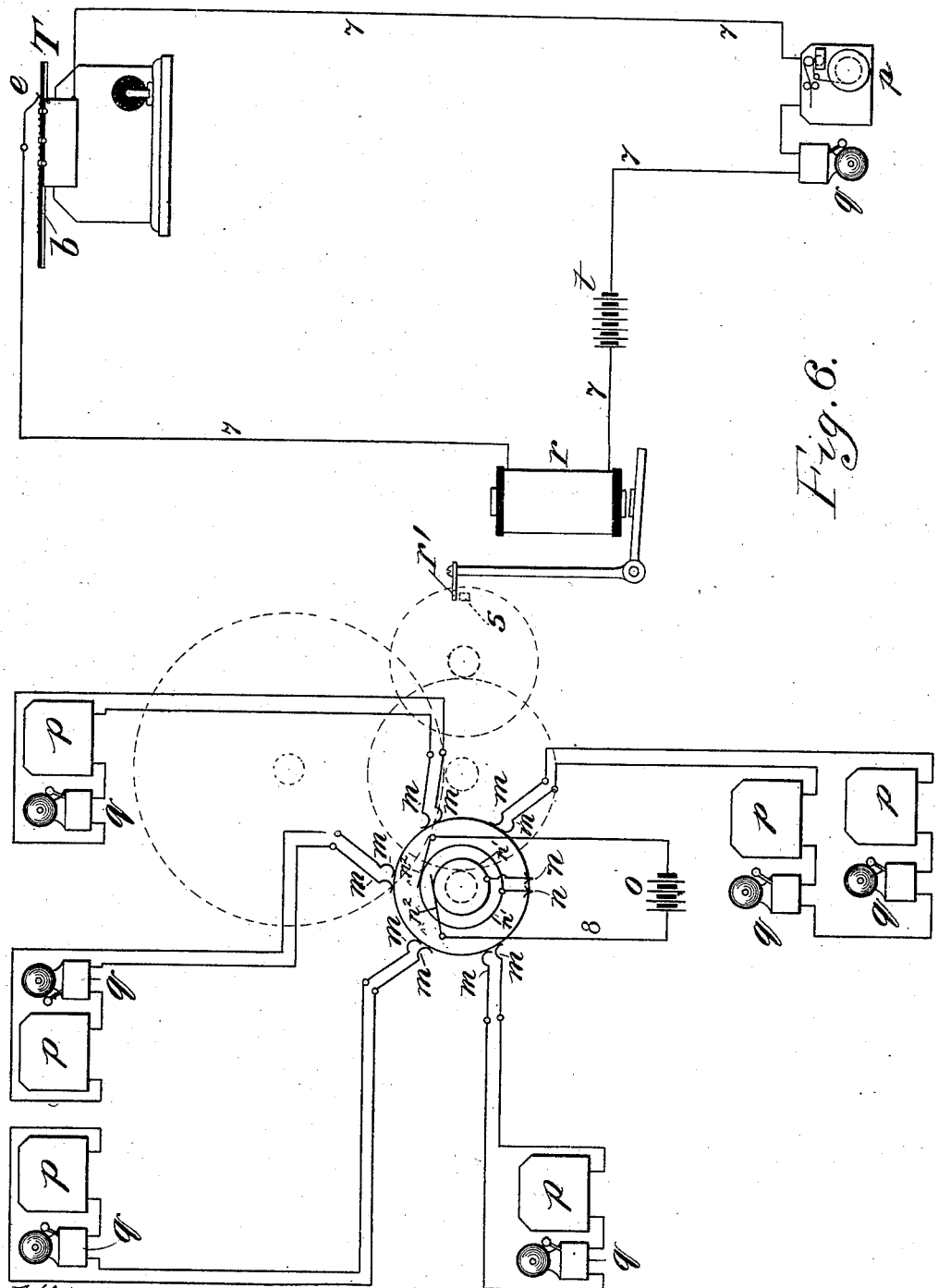

United States Patent Office.

EDWARD B. ELLICOTT, OF CHICAGO, ILLINOIS, ASSIGNOR TO THE WESTERN ELECTRIC COMPANY, OF SAME PLACE.

TELEGRAPH SIGNALING APPARATUS.

SPECIFICATION forming part of Letters Patent No. 662,527, dated November 27, 1900.

Application filed December 8, 1899. Serial No. 739,609. (No model.)

*To all whom it may concern:*

Be it known that I, EDWARD B. ELLICOTT, a citizen of the United States, residing at Chicago, in the county of Cook and State of Illinois, have invented a certain new and useful Improvement in Telegraph Signaling Apparatus, (Case No. 10,) of which the following is a full, clear, concise, and exact description.

My invention relates to telegraph signaling apparatus, and is especially adapted to be employed in connection with fire-alarm telegraph systems.

The invention particularly concerns transmitting instruments; and one object is to provide means whereby an automatic transmitter may be quickly adjusted to send any desired signal.

Another object of my invention is to provide an automatic repeater by means of which a message sent over one circuit may be transferred or repeated on a number of other circuits from a single instrument.

Heretofore automatic transmitters have been made with clock-train mechanism driving toothed wheels, the projections on which in rotating actuate electrical contact mechanism for making and breaking the circuit, the number and arrangement of the teeth on the wheel determining the character of the successive interruptions in the circuit which constitute the signal. With such a device only one message could be transmitted—i. e., that for which the wheel was made—unless the wheel were removed and another substituted. Thus it has been customary to provide at each station a set of wheels adapted to be interchanged upon the transmitting instrument, each wheel being formed to send a different signal. When it was desired to send a given signal, the proper wheel was selected and adjusted upon the transmitter.

By the use of my invention it is possible to adjust the transmitter instantly to send any signal desired within a wide range. I provide a number of contact-terminals arranged one behind another electrically connected together and a contact-spring adapted to engage the said contact-terminals, with means for producing relative movement between the contact-terminals and the spring, and adjustable guard-pieces are associated with the contact strips or pieces which carry the projecting contacts, said guard-pieces being adapted to interrupt the engagement between the contact-strips and the spring, whereby distinctive signals may be sent, according to the adjustment of the guard-pieces. It will be understood that the transmitter may thus be instantly adjusted to send any signal desired by changing the positions of the guard-pieces. The mechanism which I have provided for transferring or repeating the signal thus sent to a plurality of separate circuits from a central instrument consists, briefly, in an electromagnet for receiving the electrical impulses or signals and an armature for said electromagnet controlling the rotation of a driven wheel around which a series of circuit-terminal contacts are arranged, the wheel carrying a contact adapted successively to engage the several contacts of the other circuits as the wheel is rotated.

I will describe my invention more particularly by reference to the accompanying drawings, wherein—

Figure 2:
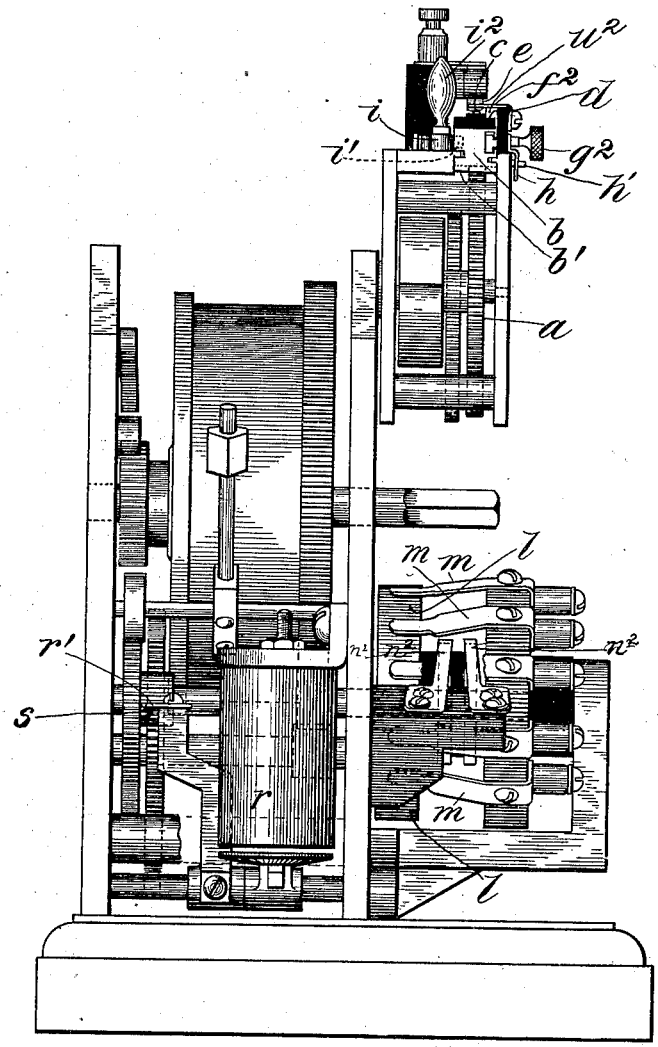
Figure 3:
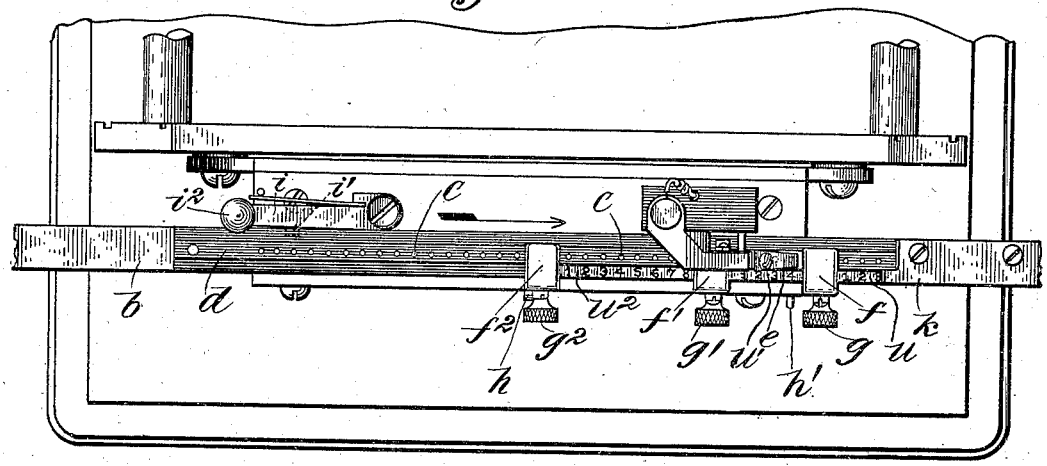
Figure 4:
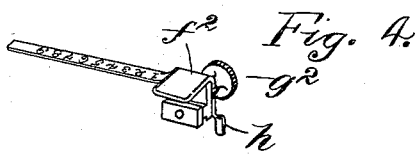
Figure 5:
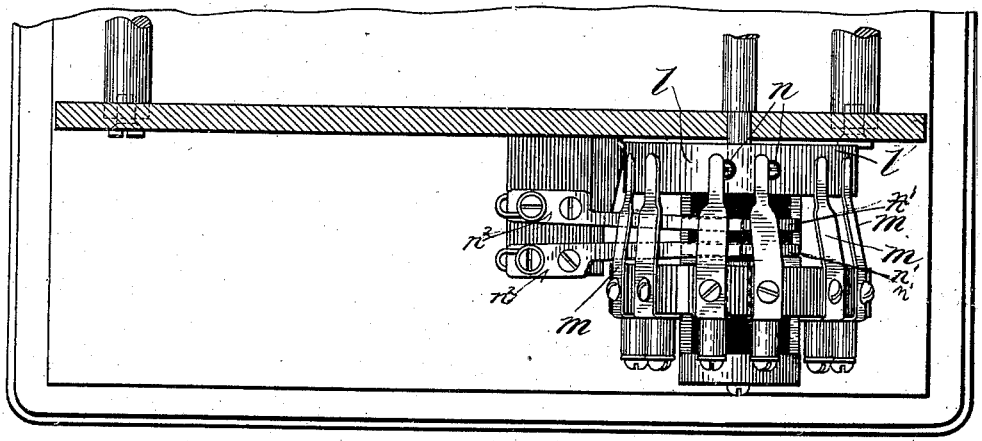

Figure 1 is an elevation of a telegraph signaling instrument embodying my invention, some of the parts being broken away the more clearly to disclose certain features of the construction. Fig. 2 is an end view thereof. Fig. 3 is a plan view of the transmitting device. Fig. 4 is a detail view of one of the guard-pieces. Fig. 5 is a plan view of a portion of the mechanism for repeating a message to a plurality of separate circuits, and Fig. 6 is a diagram illustrating the circuit connections.

The same reference characters are used to indicate the same parts wherever they are shown.

In the upper portion of Fig. 1 a spring-driven gear-train is shown, one of the wheels $a$ of which is adapted to engage with a toothed rack $b'$ on the under side of a sliding bar $b$. Contact-pieces $c\ c$ are carried by the bar, being arranged upon its upper side in a row longitudinally of the bar, and a plate of insulating material $d$ is provided on the upper surface of the bar, through which the contact-points $c$ project.

A contact-spring $e$ is mounted above the row of contact-points of the sliding bar $b$ and is adapted as the bar is moved to engage successively with the contact-points. The spring $e$ is connected with one side of a circuit 7, as shown in Fig. 6, and forms a terminal of that side of the circuit, while the other side of the circuit is connected to the frame of the transmitting instrument, and so with the row of contact-points carried by the movable bar. It will thus be seen that as the bar is moved longitudinally the contact-points $c$ $c$ will successively be brought into engagement with the spring $e$, so that the circuit 7 will regularly be made and interrupted. The movement of the bar is somewhat slow, and the spaces between the contact-points are preferably somewhat greater than the diameters of the contact-points, so that the periods in which the circuit is broken are of slightly-longer duration than the periods in which the circuit is completed.

Three guard-pieces $f$ $f'$ $f^2$ are associated with the sliding bar $b$ and are adjustable longitudinally thereon. These guard-pieces, which are provided with thum-screws $g$, $g'$, and $g^2$, whereby they may be secured at any desired position, are insulated from the bar $b$ and project over the row of contact-points carried by the bar. Each of the guard-pieces is preferably of a width sufficient to cover two of the contact-points, and it will be understood that as the bar moves along under the contact-spring $e$ the guard-pieces will at intervals interrupt the engagement of the contact-spring $e$ with the points $c$ $c$.

The guard-pieces $f$ $f'$ $f^2$ preferably carry tongues $u$, $u'$, and $u^2$, respectively, which are adapted to lie along the upper surface of the insulating-plate $d$, said tongues having numerals marked thereon at intervals corresponding to the distances between the contact-points. This is shown most clearly in Figs. 3 and 4. The guard-pieces, as before stated, may be adjusted at any desired positions along the insulating-plate $d$, being secured in place by thumb-screws. It will be understood, then, that any desired combination of numbers may thus be transmitted within a wide range.

By reference to Fig. 3 it will be seen that the apparatus is adjusted to transmit the number "348"—that is, as the bar begins its travel to the right, as shown by the arrow, the contact-spring $e$ will engage one after another with three of the points, whereupon it will be engaged by the guard-piece $f$ passing over two of the points and will then be permitted to drop again and engage one after another with four more of the contact-points. Again it will be lifted by the guard-piece $f'$, after which it will engage successively with eight points, and then be lifted by the guard-piece $f^2$. The circuit has therefore been made and broken three times in succession and then broken for a longer period of time, so transmitting the number "3." Then the circuit has been made and broken four times in succession, transmitting the number "4," again interrupted for a longer period and then made and broken eight times in succession, transmitting the number "8," after which it is permanently broken by the guard-piece $f^2$.

It should be stated that the guard-piece $f^2$ carries a projecting lug $h$, which is adapted to be engaged by a pin $h'$, mounted upon the frame of the transmitter, so that the movement of the bar will be stopped when the contact-spring $e$ has been lifted by this last guard-piece.

After a signal has been transmitted as thus described the bar $b$ may be moved backward manually to its starting-point, where it is held by a catch $i'$, carried by a pivoted arm $i$. A handle $i^2$ is provided for the arm, whereby it may be moved aside to withdraw the catch $i'$ from its engagement with the bar $b$, permitting the bar to begin its journey. When the bar is in its initial position, the spring $e$ rests upon the plate $k$, (shown at the right in Figs. 1 and 3,) this plate being insulated, so that the circuit will be normally broken.

Turning now to the apparatus for transferring or repeating a message from one circuit to a number of separate circuits, the rotating wheel or disk $l$, which is preferably of conducting material, carries two contact-points $n$ $n$, slightly raised from its surface. These contact-points are embedded each in hard rubber and are thereby insulated from the disk $l$, but are electrically connected with the metal bands or rings $n'$ $n'$, also insulated, which are in permanent contact with springs or brushes $n^2$ $n^2$, mounted upon a block of insulating material, the said brushes forming the terminals of wires leading to poles of battery $o$. A disk of insulating material, mounted rigidly in a plane parallel to disk $l$, carries a series of flexible steel springs $m$ $m$ in pairs, each pair forming the terminals of wires leading to an individual receiving-station, as clearly shown in Fig. 6. The springs $m$ $m$ bear lightly upon the periphery of disk $l$ in such manner that each revolution thereof will cause the raised contacts $n$ $n$ to engage in turn each pair of springs, and thereby transmit a single impulse to the individual stations—that is to say, at each rotation of the disk a single impulse from the battery $o$ is sent out on each circuit represented by the pair of contact-springs $m$ $m$ of the repeater. In Fig. 6 five of these separate circuits are shown, each circuit containing one or more telegraph-registers $p$ and signal-bells $q$. The disk or wheel $l$ is adapted to be rotated by a spring-driven gear-train, as shown in Figs. 1 and 2 and as indicated, diagrammatically, in Fig. 6. The speed of this gear-train is so adjusted relatively to the speed of the gear-train which drives the transmitter-bar $b$ that the disk $l$ will have time to make a complete revolution while the contact-spring $e$ of the transmitter has made and broken the circuit once before it engages the next contact-point—that is to say, the time during which the transmitter-circuit 7 is interrupted between each contact-point $c$ is sufficient to allow a complete revolution of the repeater-disk $l$.

The gear-train which drives the repeater-disk is controlled by an electromagnet $r$, whose armature-lever carries a stop $r'$, which is adapted normally to remain in the path of a lug $s$, mounted on one of the wheels of the gear-train, preventing the rotation of such wheel and stopping the train. Whenever the magnet is energized, however, it moves the stop $r'$ out of the path of the lug $s$, permitting the gear-train to revolve.

Referring now to Fig. 6, it will be seen that the circuit 7, which is controlled by the transmitter T, as previously described, includes a source of current $t$ with the magnet $r$ of the repeating mechanism. This circuit may also include a telegraph-register $p$ and a bell $q$.

The operation of the device will be understood at a glance. Each time the circuit 7 is completed by the transmitter the magnet $r$ is energized by an impulse of current from battery T and the gear-train of the repeating mechanism is allowed to start. As soon as the contact-point $c$ of the transmitter which completed the circuit has passed the contact-spring $e$ the circuit 7 will be interrupted until the next contact-point $c$ of the transmitter engages the contact-spring and again completes the circuit. The magnet $r$ will therefore be deënergized during this interruption of the circuit 7 and its armature will fly back, interposing the stop $r'$ in the path of the lug $s$ on the repeater gear-train. The gear-train of the repeater, however, will continue to rotate until the wheel carrying the lug $s$ has thus made a complete revolution. The gear-wheel which carries the lug $s$ rotates at the same speed as the disk $l$ of the repeater, and the speed is so adjusted that the disk $l$ will thus have made a complete revolution and have been stopped again before the circuit 7 is again completed at the transmitter T. Each of the five separate circuits, whose terminals are formed by the pairs of contact-springs $m\ m$, associated with the disk $l$, will have received an impulse of current from the battery $o$ by means of the contact-points or battery-terminals $n\ n$, carried by the disk $l$. Each bell on each circuit will thus be tapped once, and each telegraph-register will record the tap every time the circuit 7 is closed by the engagement of the contact-point $c$ on the movable bar of the transmitter with the contact-spring $e$.

It will be appreciated that the transmitting mechanism I have described is capable of being adjusted instantly to transmit any number of three figures by loosening the set-screws $g\ g'\ g^2$ and adjusting the guard-pieces to the desired positions.

Having thus described my invention, what I claim as new, and desire to secure by Letters Patent, is—

1. In a telegraph signaling apparatus, the combination with a longitudinally-movable bar having a series of contact-points mounted thereon, of means for moving the bar in the direction of its length, a contact-spring adapted successively to engage the contact-points as the bar is moved, an electric circuit, the contact-points of the bar being terminals for one side of the circuit and the contact-spring being the terminal of the other side of the circuit, whereby the circuit is made and broken alternately as the bar is moved, and guard-pieces carried by the movable bar and capable of being adjusted longitudinally of the bar, said guard-pieces being adapted to prevent engagement between the contact-spring and the contact-points of the bar, whereby signals may be transmitted, substantially as set forth.

2. In a telegraph signaling apparatus, the combination with a movable bar having a series of contact-points mounted thereon, constituting terminals for one side of an electric circuit, of a contact-spring forming a terminal for the other side of the circuit, said spring being adapted to engage successively with said contact-points, whereby the circuit is alternately made and broken, a spring-driven gear-train for moving the bar, guard-pieces adapted to slide to and fro on the bar and so to be adjusted to any desired point on the operative length of the bar, said guard-pieces serving to cover certain of the contact-points to prevent the engagement of the spring with such contact-points, whereby signals may be transmitted, as described.

3. The combination with an electric circuit, of a series of contact-points forming terminals for one side of said circuit, a stationary contact-spring $e$ forming the terminal for the other side of the circuit, adapted to engage said contact-points, to make and break the circuit, a movable mounting for said contact-points and means for moving the same past the contact-spring, whereby said contact-points are successively caused to engage the stationary spring, and guard-pieces, adjustable relatively to said contact-points, for covering one or more of the points and preventing engagement of the spring therewith, substantially as and for the purpose specified.

4. The combination with an electric circuit, of a series of contact-points $c\ c$ forming the terminals of one side of said circuit, a movable mounting for said contact-points, a stationary contact-spring $e$ forming a terminal for the other side of the circuit, adapted to engage said contact-points, to make and break the circuit, means for moving the mounting of said contact-points, whereby the latter are caused successively to engage the contact-spring, and independent guard-pieces, each adapted to cover one or more of the contact-points, to prevent the engagement of the contact-spring with the points so covered, said guard-pieces being adjustable to occupy different positions relatively to the series of contacts, whereby a variety of signals may be transmitted, as described.

In witness whereof I hereunto subscribe my name this 14th day of August, A. D. 1899.

EDWARD B. ELLICOTT.

Witnesses:
   JOHN B. PORTER,
   E. P. WARNER.